United States Patent [19]

Klein

[11] Patent Number: 4,558,838
[45] Date of Patent: Dec. 17, 1985

[54] STORAGE RACK WITH WOOD CROSS BARS AND END BRACKET FOR THE SAME

[75] Inventor: Herbert H. Klein, Arlington Heights, Ill.

[73] Assignee: Unarco Industries, Inc., Chicago, Ill.

[21] Appl. No.: 666,343

[22] Filed: Oct. 30, 1984

[51] Int. Cl.$^4$ ............................................. A47G 29/02
[52] U.S. Cl. ........................................ 248/235; 52/778;
  248/300; 403/199; 403/403
[58] Field of Search ............... 248/235, 217.3, 216.4,
  248/218.3, 307, 310, 300, 297.2; 108/159, 107,
  110; 52/778, 775, 780

[56] References Cited

U.S. PATENT DOCUMENTS

| | | | |
|---|---|---|---|
| 2,084,225 | 6/1937 | Slaughter et al. | 52/778 |
| 2,528,807 | 11/1950 | Whitney | 108/110 |
| 2,724,960 | 11/1955 | Nelsson | 248/235 |
| 3,163,961 | 1/1965 | Kemp | 52/778 |
| 3,298,651 | 1/1967 | Passer | 248/217.3 |
| 3,343,318 | 9/1967 | Birum | 52/775 |
| 3,637,183 | 1/1972 | Sagers | 248/235 |
| 3,815,162 | 6/1974 | Hall | 248/235 |
| 4,031,664 | 6/1977 | Wendt | 248/300 |
| 4,441,684 | 4/1984 | Credle | 248/300 |
| 4,450,775 | 5/1984 | Brendle | 108/107 |

*Primary Examiner*—Britts Ramon S.
*Assistant Examiner*—Ramon O. Ramirez
*Attorney, Agent, or Firm*—Clement and Ryan

[57] ABSTRACT

A novel end bracket for the ends of each of several wood cross bars that support the shelf decking in a storage rack, and a storage rack incorporating the same. The end bracket has a rigid main rectangular plate with a thin, flat, rigid supporting tongue extending rigidly outward from one side of the plate for a substantial distance beyond the cross bar end. A rigid flange extends downward from each end of the main rectangular plate for embracing the cross bar end. A rigid finger extends inward at the bottom of each of the flanges, at a slight obtuse angle to the flange, for confining the cross bar end. At least one rigid hook member extends inward at the bottom of each flange, with a rigid tapered tip oriented at an acute angle to the shank of the hook member, for fixedly securing the end bracket to the cross bar by driving the hook into the cross bar.

5 Claims, 10 Drawing Figures

STORAGE RACK WITH WOOD CROSS BARS AND END BRACKET FOR THE SAME

This invention relates to a storage rack in which the shelves are formed of particle board or plywood decking and are supported by wood cross bars, and to a novel bracket for supporting the ends of such cross bars.

BACKGROUND OF THE INVENTION

Storage racks have been used for many decades in which several wood cross bars (which are themselves supported on steel step ledge beams running lengthwise of the shelves) support shelving formed of particle board or plywood decking. Some users prefer to employ formed steel cross bars in place of wood cross bars to support the shelf decking, but such structures cost substantially more. For the relatively short spans involved, wood cross bars for supporting the decking are much more economical.

Although they have been in use a very long time, conventional storage racks utilizing wood cross bars have several disadvantages. One such storage rack has the advantage that both longitudinal edge portions of the rectangular shelving are fully supported on the steel step ledge beams on each side of the rack, so that a minimum number of cross bars is required to provide support across the lateral mid-portion of the shelf decking. However, in this type of storage rack the typical decking of ¾" thickness uses up storage space because it extends above the step ledge beams on which it is supported. In addition, the raw decking edge is exposed, which from time to time may cause the user of the storage rack to get wood slivers in his hand or in the products being stored. Finally, the decking must be fastened down by fasteners such as nails driven into the wood cross bars.

In a variation of this conventional storage rack, the ends of the wood cross bars are notched to drop them down farther on the step ledge beams so that the decking thickness does not use up any storage space, there are no exposed sliver-carrying edges on the decking and, since the decking is contained by the rear wall of each step, no nails or other fasteners are required. In addition, the top of the step ledge beam on each side of the shelf is flush with the decking and this maintains the effective usable area of the shelf. However, since the shelf decking is ordinarily not flexible enough to bend down the required 1" or so to bring it into contact with the step of the steel step ledge beam, this variation provides no support for the longitudinal edge portions of the decking, which makes it necessary to employ more cross bars and therefore increases the cost. In addition, the notches in the two ends of each cross bar add to the cost of fabrication and reduce the strength of the structure.

If the last two disadvantages of this variation of the conventional deck were avoided by omitting the notches in the cross bars and making the steps in the steel step ledge beams deeper, this would require the beams themselves to be of deeper dimensions, and would thereby very substantially increase the materials cost for the storage rack.

The storage rack and end bracket of the present invention achieve all the advantages referred to that are achieved with the conventional storage racks with decking shelves supported as just described, and present none of the disadvantages involved in those conventional racks.

SUMMARY OF THE INVENTION

The storage rack of this invention includes a novel end bracket for the ends of each of several wood cross bars that support the shelf decking in the rack. Each of the cross bars has a predetermined maximum and minimum length, two major surfaces of a predetermined width, and predetermined maximum and minimum thicknesses.

The end bracket of this invention comprises:

1. A rigid main rectangular plate that has a predetermined width sufficiently large that the plate provides a secure overlying contact with the end of the cross bar even when the cross bar is of its predetermined minimum length;

2. A thin, flat, rigid supporting tongue extending rigidly outward from one side of the rectangular plate for a predetermined distance sufficiently large that the tongue extends a substantial distance beyond the cross bar end even when the cross bar is of its predetermined maximum length;

3. A rigid flange extending rigidly downward from each end of the main rectangular plate for embracing the cross bar end in a position in which the tongue extends outward from the cross bar a substantial distance;

4. A rigid finger extending rigidly inward at the bottom of each of the flanges for confining the cross bar end; and 5. At least one rigid hook member extending inward at the bottom of each of the flanges for fixedly securing the end bracket to the cross bar by driving the hook into the cross bar.

The finger that extends inward at the bottom of each of the described flanges has its base at a distance from the main rectangular plate that is substantially equal to the predetermined minimum thickness of the cross bar. The free end of the finger is at a distance from the main rectangular plate that is substantially equal to the predetermined maximum thickness of the cross bar.

Each of the one or more hook members that extends inward at the bottom of each of the flanges has a rigid shank connected at its base to the flange, and the shank carries at its free end a rigid, tapered tip that is rigidly oriented at an acute angle to the shank. The base of this shank is at a distance from the main rectangular plate that is substantially equal to the predetermined minimum thickness of the cross bar. The free end of the tapered tip is normally at a distance from the main rectangular plate that is substantially equal to the predetermined maximum thickness of the cross bar.

As pointed out above, the present invention achieves all the advantages and avoids all the disadvantages of the prior art storage racks that employ wood cross bars. In addition, the rack and end bracket of this invention provide several additional advantages.

First, as a result of the construction described above, the end bracket can be securely attached to a cross bar of any thickness between its predetermined maximum and minimum thicknesses. The bracket can, in other words, accommodate variations in the thickness of the cross bar, yet provide a positive securing force at both the bottom and the tqp surfaces of the cross bar.

Second, the end bracket can be secured to a wood cross bar at any of several positions to accommodate a bar of any length between the predetermined maximum and minimum lengths. Put another way, the end bracket of this invention has a lengthwise adjustability to accommodate cross bars of slightly different lengths.

Finally, the hook members of the end bracket provide a very secure connection of the bracket to the cross bar end, for when the end bracket is installed in place not only are the hooks driven into the wood cross bar but, because of the acute angle between the hook tip and its shank, the hooks slant back within the wood that comprises the end portion of the cross bar, thus providing additional security of attachment of the bracket to the bar.

An improved storage rack results when the end bracket of this invention is incorporated in a rack to provide support for the ends of the wood cross bars (which in turn support the shelf decking) on the ledges of the steel step ledge beams along the sides of each shelf.

BRIEF DESCRIPTION OF THE DRAWING

This invention will now be described with reference to the accompanying drawing, in which.

DETAILED DESCRIPTION OF ONE EMBODIMENT OF THE INVENTION

FIGS. 5-10 show one embodiment of the storage rack and end bracket of this invention. This embodiment is to be contrasted with the prior art storage racks shown in FIGS. 1-4.

PRIOR ART STORAGE RACKS

First Prior Art Storage Rack

Figure 1:
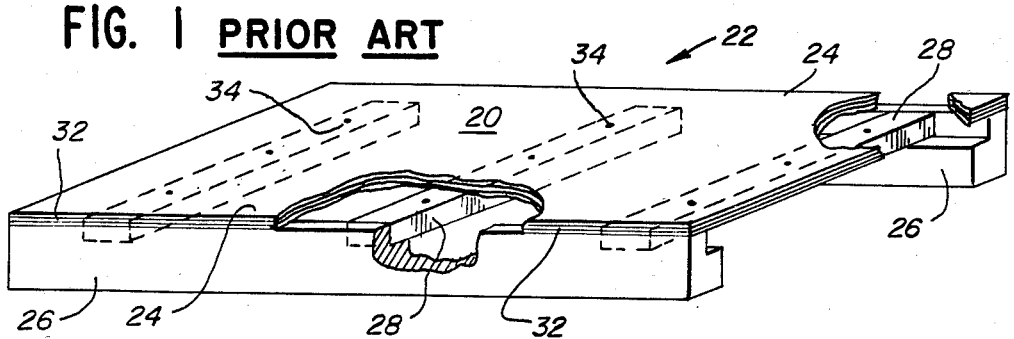
FIG. 1 is a fragmentary, isometric three-quarters view of shelf decking of a storage rack supported in a conventional manner.

FIG. 1 is a fragementary, isometric three-quarters view of rectangular shelf decking 20 of storage rack 22 supported in a conventional manner. Both longitudinal edges 24 of the rectangular shelving are fully supported on each side of the rack on the top walls of steel step ledge beams 26, which are in turn supported on suitable vertical frame posts (not shown).

The rectangular shelf decking shown in FIG. 1 is approximately 4' wide and 8' long. In this prior art storage rack, three or four wood cross bars 28 (typically formed of conventional 2"×4" lumber) are supported at each end by step 30 of beam 26. In conjunction with the support of edge portions 24 of deck shelving 20 by beams 26 already mentioned, this minimum number of wood cross bars provides sufficient support for shelf decking 20 when product to be stored is placed on the shelf.

Despite the advantage of the indicated positive support of edge portions 24 of shelf decking 20, it is seen that this prior art shelving system has several disadvantages. Decking 20 is typically formed of ¾" thick particle board or plywood, and this thickness uses up a small but important part of the available storage space because it extends above beams 26 on which the decking is supported. In addition, raw edge 32 of decking 20 is in an exposed position where, from time to time, it may cause the user of the storage rack to get wood slivers in his hand or in the product being stored. Finally, decking 20 must be fastened down by fasteners such as nails 34 that are driven into the wood decking and wood cross bars 28 beneath the decking.

Figure 2:
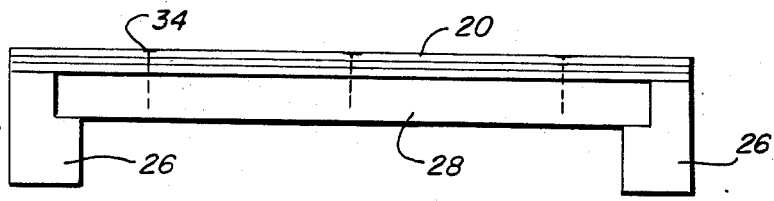
FIG. 2 an enlarged end elevation of the shelf support system of FIG. 1 seen from the right-hand side of the latter Figure.

If no such fasteners were employed, it is seen that decking 20 would be free to slide on step ledge beams 26. FIG. 2 shows how nails 34 and cross bars 28 secure decking 20 in this prior art storage rack against sidewise displacement.

Second Prior Art Storage Rack

Figure 3:
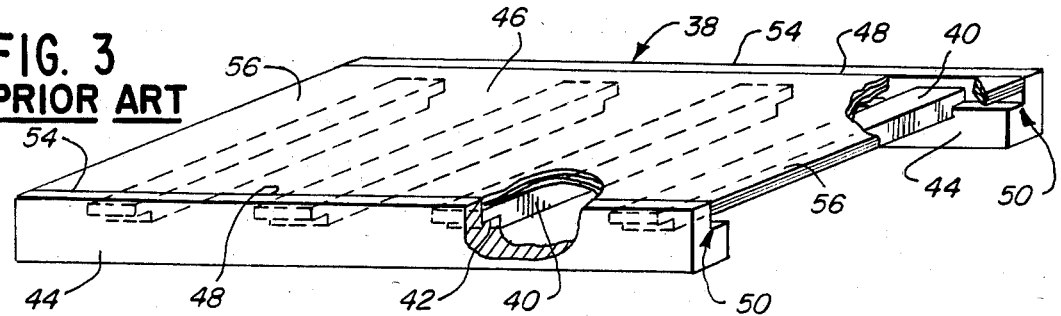
FIG. 3 a view similar to FIG. 1 of another form of a conventional support for deck shelving in a storage rack.
Figure 4:
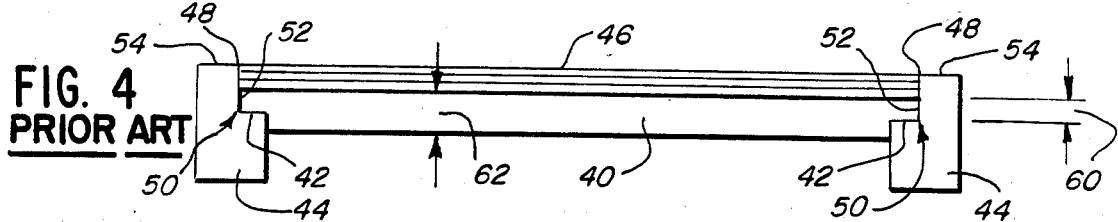
FIG. 4 is an enlarged end elevation of the shelf support system of FIG. 3 seen from the right-hand side of the latter Figure.

FIGS. 3 and 4 show a second prior art storage rack 38 in which the ends of wood cross bars 40 are notched at 42 to drop them down farther on step ledge beams 44.

In this embodiment, the extra space provided when cross bars 40 are dropped down a distance accommodates the thickness of shelf decking 46 so that that thickness does not use up any storage space. In addition, there are no exposed sliver-carrying edges on decking 46 because raw edges 48 of the decking nest within steps 50 of beams 44. Since decking 46 is contained by rear wall 52 of each step 50, no nails or other fasteners are required to prevent sidewise movement of decking 46 in this form of storage rack. In addition, top wall 54 of each step ledge beam 44 on each side of shelf 46 is flush with the decking, which maintains the effective useful area of the shelf.

One of the disadvantages of this form of storage rack is that wood cross bars 40 provide support for decking 46 only at the two shorter edge portions 56 of the shelf, along which the outer cross bars 40 are positioned. As will be seen from FIGS. 3 and 4, longer edges 48 of decking 46 are supported only at intervals by cross bars 40.

In addition, notches 42 in the two ends of each cross bar 40 add to the cost of fabrication of the storage rack. Moreover, since thickness 60 of the portion of cross bar 40 lying above notch 42 is less than thickness 62 of the remainder of cross bar 40, the strength of the support supplied by the cross bars to decking 46 is reduced.

It might be suggested that to avoid the latter two disadvantages notches 42 in cross bars 40 could be eliminated by increasing the depth of steel step ledge beams 44. However, this would obviously require that these beams be deeper and would very greatly increase the materials cost for the rack.

STORAGE RACK AND END BRACKET OF THIS INVENTION

The storage rack of this invention, in which the shelves are formed of particle board or plywood decking and are supported by wood cross bars, and the novel bracket for supporting the ends of these cross bars, will now be described with reference to FIGS. 5–10 of the drawing.

Support Of Shelving

Figure 5:
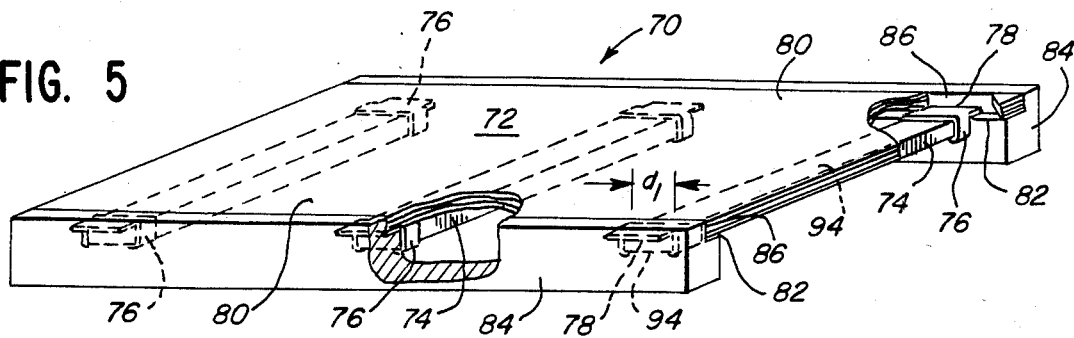
FIG. 5 is a view similar to FIGS. 1 and 3 of shelf decking supported according to the present invention.

FIG. 5 shows a portion of storage rack 70 in which shelf decking 72 is supported by three wood cross bars 74 and their end brackets 76, which are securely attached to each end of cross bars 74.

Thin, flat, rigid, supporting tongue 78 of end bracket 76 is the only material that is interposed between cross bar 74 and the overlying portions of decking 72, and between edge portions 80 of decking 72 and step 82 of beam 84.

Since tongue 78 is typically formed of steel that is only a little more than about 1/16" thick, and decking 72 has a slight degree of flexibility, the structure described means that when a heavy load is placed on shelf 72, the decking will bow down along wood cross bars 74 and along steps 82 of steel beams 84, to be supported positively by members 74 and 84 in a very large part of the areas of shelf decking 72 that overlie those members.

Advantages Of This Invention

The described structure avoids the following prior art disadvantages that have been referred to above:

1. Shelf decking 72, typically formed of $\mu$" thick particle board or plywood decking, does not extend above step ledge beam 84 to intrude into the storage space.
2. The raw decking edges along edge portions 80 of shelf decking 72 are not exposed, so that the user of the storage rack does not run the risk of getting wood slivers in his hand or in the products being stored.
3. No fasteners need to be provided for shelf decking 72, because rear walls 86 of steps 82 of steel step ledge beams 84 enclose and contain the decking.
4. The top surface of each step ledge beam 84 is flush with decking 72, which maintains the effective usable area of the shelf.

As will be seen from the following discussion of FIGS. 7–10, the end bracket of this invention has additional advantages that provide an improved construction for any storage rack in which the end bracket is incorporated.

Main Rectangular Plate

Figure 7:
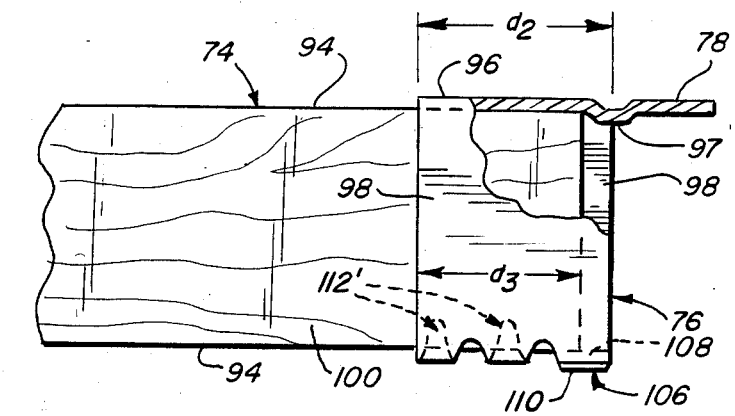
FIG. 7 is a further enlarged, fragmentary, side elevation of the end bracket of this invention attached to the end of a cross bar having the predetermined minimum length.

In FIG. 7, end bracket 76 is securely attached to the end of wood cross bar 74, which in this showing has the predetermined minimum length of cross bars employed with the end bracket of this invention.

Cross bar 74 has two major surfaces 94 of a predetermined width $d_1$ (FIG. 5). Bracket 76 includes main rectangular plate 96 for overlying secure contact with one of the cross bar major surfaces 94.

Plate 96 has a predetermined width $d_2$ sufficiently large that the plate will provide secure overlying contact with cross bar 74 when, as in FIG. 7, the cross bar is of its predetermined minimum length. In this Figure, the shortfall in the length of cross bar 74 is exaggerated for emphasis over what is likely to be encountered in the actual construction of storage racks in accordance with the present invention. However, it is preferred that even small variations in the length of the cross bars such as are likely to be found in actual construction be adjusted for, as the end bracket of this invention does.

As will be seen from FIG. 7, the width of plate 96 is such that even though the cross bar of predetermined minimum length may not fully reach the right-hand edge of flange 98, still end bracket 76 overlaps the end of bar 74 by a distance $d_3$ that is sufficiently large that there is a secure contact between the end bracket and cross bar.

In the embodiment shown, main rectangular plate 96 is stiffened by depressed portion 97 extending longitudinally of the plate.

Downwardly Extending Flanges

Figure 9:
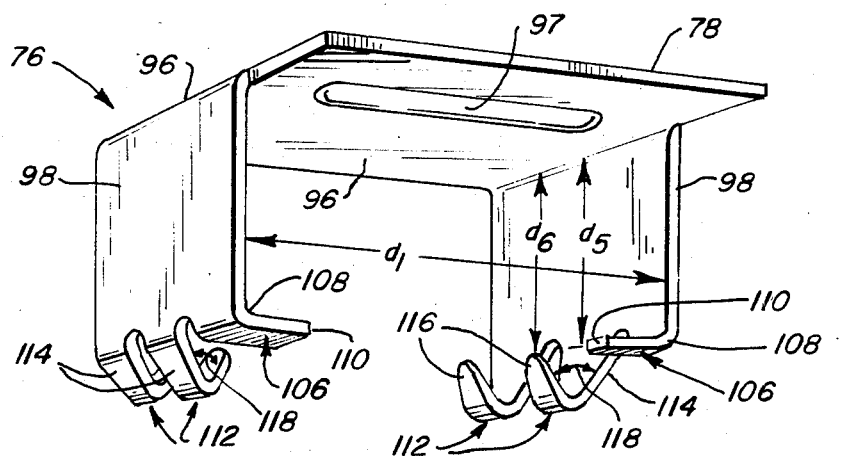
FIG. 9 is a three-quarters isometric view of the end bracket of this invention from the bottom of the bracket.

Rigid flanges 98 extend rigidly downward from each end of main rectangular plate 96 to embrace the end of cross bar 74. As seen in FIG. 9, the internal distance between the two downwardly extending flanges 98 is substantially equal to width $d_1$ of the end of cross bar 74.

Each flange 98 preferably has a width substantially equal to width $d_2$ of main rectangular plate 96. This dimension provides a secure contact between downwardly extending flanges 98 and side walls 100 of cross bar 74.

Supporting Tongue

Figure 8:
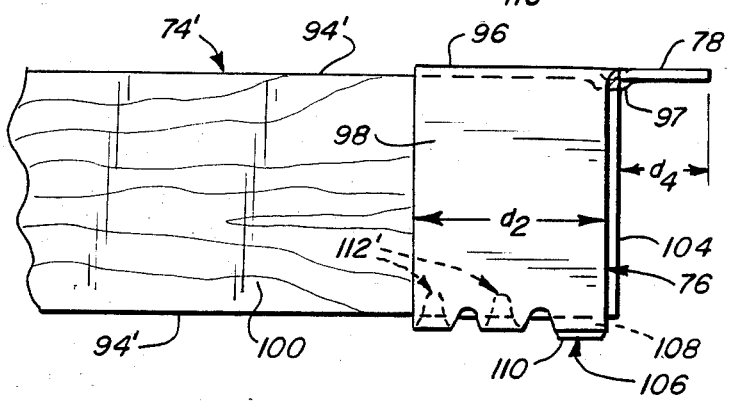
FIG. 8 is a view similar to FIG. 7 of the end bracket of this invention mounted on the end of a wood cross bar having the predetermined maximum length.

As best seen in FIGS. 7–9, thin, flat, rigid, supporting tongue 78 extends rigidly outward from one side of main rectangular plate 96. It extends for a predetermined distance sufficiently large that the tongue extends a distance $d_4$ beyond cross bar end 104 even when the cross bar is of its predetermined maximum length. In FIG. 8 the amount by which wood cross bar 74' exceeds the standard length for such bars is again exaggerated for emphasis.

The distance tongue 78 extends outward from main rectangular plate 76 is preferably substantially less than predetermined width $d_2$ of the rectangular plate.

Figure 6:
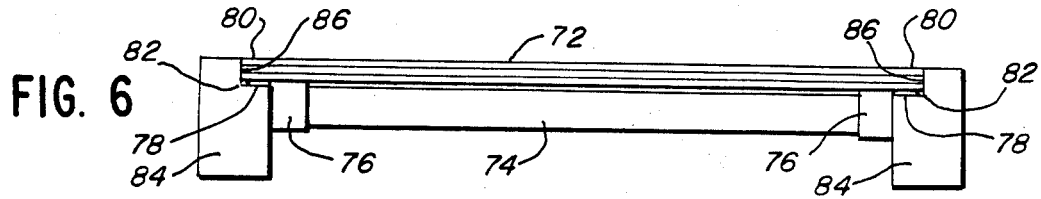
FIG. 6 is an enlarged end elevation of the shelf support system of FIG. 5 seen from the right-hand side of the latter Figure.

As explained above, tongue 78 (like the remainder of end bracket 76) is formed of steel of a thickness not much more than about 1/16". The decking of the shelf is supported at all times by contact with main rectangular plates 96 of brackets 76 at the ends of cross bars 74 (or 74'), and with tongues 78 extending outward from the ends of cross bars 74 (or 74'). When a sufficiently heavy load is stored on shelf decking 72, the decking bows downward in the lengthwise direction between end brackets 76 of adjacent cross bars 74 (74'), and at the same time bows downward between end brackets 90 at opposite ends of each individual cross bar (FIGS. 5 and 6). In this latter condition, the decking is supported not only (1) by main rectangular plates 96 and tongues 78, but also (2) by substantial intervening portions of steps 82 in steel step ledge beams 84, and (3) by substantial intervening portions of top surfaces 94 of cross bars 74 (or 74').

Inwardly Extending Fingers

Rigid finger 106 extends rigidly inward at the bottom of each flange 98. The fingers of each pair of opposing fingers 106 confine the end of wood cross bar 92 between them.

Base 108 of finger 106 is positioned at a distance $d_5$ from main rectangular plate 96 that is substantially equal to the predetermined minimum thickness of the cross bar. Free end 110 of finger 106 is positioned at a distance $d_6$ from main rectangular plate 96 that is substantially equal to the predetermined maximum thickness of the cross bar. (These dimensions can be observed in FIGS. 6 and 7, and are specifically deisgnated in FIG. 10.) As a result of these dimensions, each finger 106 extends at a relatively small obtuse angle from the flange with which it is associated.

Figure 10:
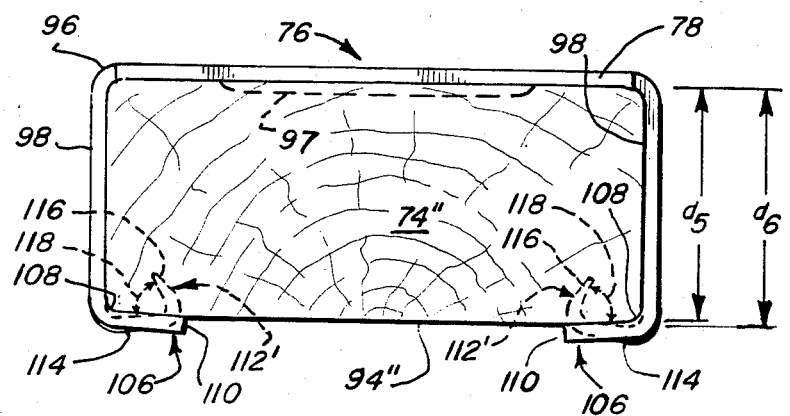
FIG. 10 is an end elevation of the embodiment of the end bracket of this invention shown in FIG. 7, taken from the right-hand side of the latter Figure.

The indicated orientation of each finger 106 means that end bracket 76 can be easily and securely attached to a wood cross bar no matter where its thickness falls between the predetermined maximum and minimum thickness of the bars with which the end bracket of this invention is designed to be used. Cross bars 74 and 74' in FIGS. 7 and 8 are of the predetermined minimum thickness; as is seen in those Figures, base 108 of each finger 106 is in tight contact with bottom surface 94 (or 94') of cross bar 74 (or 74') even though free end 110 is not. Cross bar 74" in FIG. 10 is of the maximum predetermined thickness; in that Figure, free end 110 of finger 106 is in tight contact with bottom surface 94" of cross bar 74", base 108 and the rest of finger 106 have dug into the wood cross bar to compress the portion of the bar underlying the finger and thereby increase still further the security of attachment of the end bracket to the cross bar.

In the embodiment shown, each finger 106 extends inward from its associated flange 98 from directly beneath the side of main rectangular plate from which supporting tongue 78 extends outwardly (to the right in FIGS. 7 and 8). This means that if end bracket 76 must be forced on the cross bar because it is of the maximum predetermined thickness (as explained just above in connection with FIG. 10), the finger will be forced for only the minimum distance.

Hook Members

As shown in FIG. 9, at least one rigid hook member 112 extends inward at the bottom of each flange 98 for fixedly securing end bracket 76 to the cross bar. This is accomplished by driving hook 112 into position 112' within wood cross bar 74 (or 74' or 74" )after end bracket 76 has been pushed onto the end of the cross bar.

Each hook member 112 has a rigid shank 114 that is connected (as best seen in FIG. 9) at its base to flange 98. Each of these shanks carries at its free end a rigid, tapered tip 116 that is rigidly oriented at acute angle 118 to its shank.

The base of shank 114 of each hook member 112 is positioned at a distance $d_5$ from main rectangular plate 96 that is substantially equal to the predetermined minimum thickness of the cross bar. The free end of tapered tip 116 is normally positioned at distance $d_6$ from main rectangular plate 96 that is substantially equal to the predetermined maximum thickness of the cross bar.

As seen in FIG. 10, after end bracket 76 is placed on the wood cross bar, the free end of tapered tip 116 is driven into the wood cross bar to secure end bracket 76 in its final condition on the end of the cross bar. Because of acute angle 118, when hook tip 116 is driven into the end of the wood cross bar, a portion of the cross bar within the space encompassed by tapered tip 116 positioned at acute angle 118 to its shank 114 is embraced to produce a still firmer connection between end bracket 76 and the cross bar to which it is secured.

As pointed out above, the described construction of the end bracket and storage rack of this invention means that the bracket can be securely attached to a wood cross bar of any thickness between its predetermined maximum and minimum thicknesses at any of several positions to accommodate a cross bar of any length between its predetermined maximum and minimum lengths.

The above detailed description has been given for clearness of understanding only. No unnecessary limitations should be understood therefrom, as modifications will be obvious to those skilled in the art.

I claim:

1. A bracket for the end of one of several wood cross bars that support the shelf decking in a storage rack, said cross bar having:
   (i) predetermined maximum and minimum lengths,
   (ii) two major surfaces of a predetermined width, and
   (iii) predetermined maximum and minimum thicknesses, which end bracket comprises:
   (a) a rigid main rectangular plate for overlying contact with one of said cross bar major surfaces with its long dimension oriented transverse to the cross bar, said rectangular plate having a predetermined width sufficiently large that the plate will provide a secure overlying contact with said cross bar end when the cross bar is of its predetermined minimum length;
   (b) a thin, flat, rigid, supporting tongue extending rigidly outward from one side of said main rectangular plate for a predetermined distance sufficiently large that said tongue will extend a substantial distance beyond said cross bar end when the cross bar is of its predetermined maximum length;
   (c) a rigid flange extending rigidly downward from each end of said main rectangular plate for embracing one of said cross bar ends in a position in which said tongue extends outward from said cross bar a substantial distance beyond the end of the bar;
   (d) a rigid finger extending rigidly inward at the bottom of each of said flanges for confining said cross bar end, said finger extending at a relatively small obtuse angle to said flange, with the base of said finger being at a distance from said main rectangular plate substantially equal to said predetermined maximum thickness of said cross bar and the free end of said finger being at a distance from said rectangular plate substantially equal to said predetermined maximum thickness of said cross bar; and
   (e) at least one rigid hook member extending inward at the bottom of each of said flanges for fixedly securing said end bracket to said cross bar by driving said at least one hook into the cross bar, each of said hooks having a rigid shank connected at its base to said flange, said shank carrying at its free end a rigid, tapered tip, said tip being rigidly oriented at an acute angle to said shank, the base of said shank being at a distance from said main rectangular plate substantially equal to said predetermined minimum thickness of said cross bar and the free end of said tapered tip being normally at a distance from said main rectangular plate substantially equal to said predetermined maximum thickness of said cross bar, whereby said end bracket can be securely attached to a cross bar of any thickness between said predetermined maximum and minimum thicknesses at any of several positions to accommodate a cross bar of any length between said predetermined maximum length and said predetermined minimum length, and each of said hook tips, which tips are rigidly oriented at an acute angle to their respective hook shanks, can be driven into said wood cross bar ends to embrace a portion of said cross bar within the space encompassed by the tapered tip positioned at said acute angle to its shank.

2. The end bracket of claim 1 in which said predetermined distance said tongue extends outward from one side of said rectangular plate is smaller than said predetermined width of the rectangular plate.

3. The end bracket of claim 1 in which each of said downwardly extending flanges is of substantially the same width as said main rectangular plate.

4. The end bracket of claim 1 in which said rigid fingers extend inward from said flanges directly beneath the side of said main rectangular plate from which said supporting tongue extends.

5. A storage rack including a rectangular shelf decking member, a pair of horizontal, parallel, step ledge beams, and a plurality of wood cross bars, in which:
 (a) the end bracket of claim 1 is attached to both ends of each wood cross bar, with (i) said main rectangular plate, (ii) said downwardly extending flanges, and (iii) said fingers all embracing said cross bar end securely;
 (b) said hook members are driven securely into the cross bar;
 (c) said thin, flat, rigid, outwardly extending supporting tongue of each of said end brackets rests, at both ends of each of said cross bars, on a step of one of said pair of horizontal, parallel step ledge beams; and
 (d) said shelf decking (i) is supported by continued contact with said tongues, and (ii) when bowed downward slightly by a load stored thereon, is supported by said steps and said cross bars.

* * * * *